United States Patent [19]

Baskey

[11] Patent Number: 5,894,547
[45] Date of Patent: Apr. 13, 1999

[54] VIRTUAL ROUTE SYNCHRONIZATION

[75] Inventor: Michael Edward Baskey, Wappingers Falls, N.Y.

[73] Assignee: International Business Machines Corporation, Armonk, N.Y.

[21] Appl. No.: 08/245,053

[22] Filed: May 17, 1994

Related U.S. Application Data

[63] Continuation of application No. 07/722,720, Jun. 27, 1991, abandoned.

[51] Int. Cl.$^6$ .................................................. G06F 11/00
[52] U.S. Cl. ..................... 395/182.1; 370/324; 375/357; 395/200.78
[58] Field of Search ........................... 371/32, 33, 11.2, 371/11.3, 7, 5.4, 9.4, 8.2, 12, 42; 370/31, 101.1, 105.2, 77, 324, 350; 340/825.14; 375/356, 357; 395/200.78, 553, 182.1

[56] References Cited

U.S. PATENT DOCUMENTS

| | | | |
|---|---|---|---|
| 4,757,442 | 7/1988 | Sakata | 371/12 |
| 4,807,224 | 2/1989 | Naron et al. | 370/94 |
| 4,899,142 | 2/1990 | Nakayashiki et al. | 371/11.2 |
| 4,926,414 | 5/1990 | Baratz | 370/31 |
| 4,970,714 | 11/1990 | Chen et al. | 371/32 |
| 5,007,055 | 4/1991 | Isono et al. | 371/32 |
| 5,016,243 | 5/1991 | Fite, Jr. | 371/8.2 |
| 5,021,949 | 6/1991 | Morten et al. | 364/200 |
| 5,027,342 | 6/1991 | Boulton et al. | 371/8.2 |
| 5,095,444 | 3/1992 | Motles | 370/13 |
| 5,163,137 | 11/1992 | Yamamoto et al. | 371/33 |
| 5,168,497 | 12/1992 | Ozaki et al. | 370/94.1 |
| 5,216,675 | 6/1993 | Melliar-Smith et al. | 371/32 |
| 5,218,601 | 6/1993 | Chujo et al. | 371/11.2 |
| 5,224,105 | 6/1993 | Highley | 371/32 |
| 5,245,616 | 9/1993 | Olson | 371/32 |
| 5,265,103 | 11/1993 | Brightwell | 371/32 |
| 5,297,143 | 3/1994 | Fridrich et al. | 371/32 |

OTHER PUBLICATIONS

SNA Theory and Practice, Anura Gurugé (attached). A Comprehensive Guide to IBM's Systems Network Architecture.

Chin-Lin et al. 'Transparent Self-Healing Communication Networks' pp. 509–514 IEEE.

Gunnar Karlsson, Packet Video and Its Integration into the Network Architecture. pp. 739–751 IEEE Journal.

Primary Examiner—Albert DeCady
Attorney, Agent, or Firm—William A. Kinnaman, Jr.

[57] ABSTRACT

A method for resynchronizing message traffic in a communication network following network component failure. The failing component, upon restart, establishes a second path for communicating with the still active communication network components. The alternate path is used to query status from the operational components and to inform the failed component of synchronization data. Control information for a primary virtual route is updated based upon the status query. This updated information is used to resynchronize message activity and allow resumption of message traffic without reinitializing the network.

20 Claims, 4 Drawing Sheets

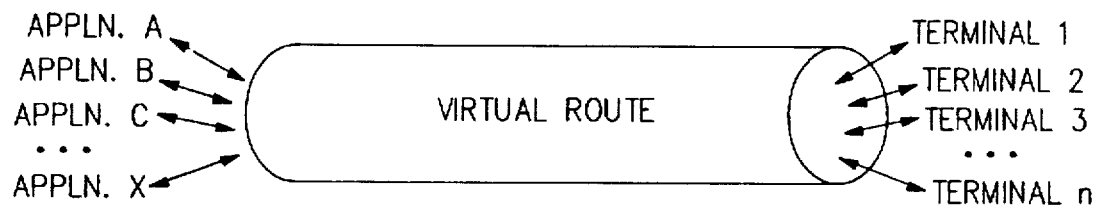
FIG.3
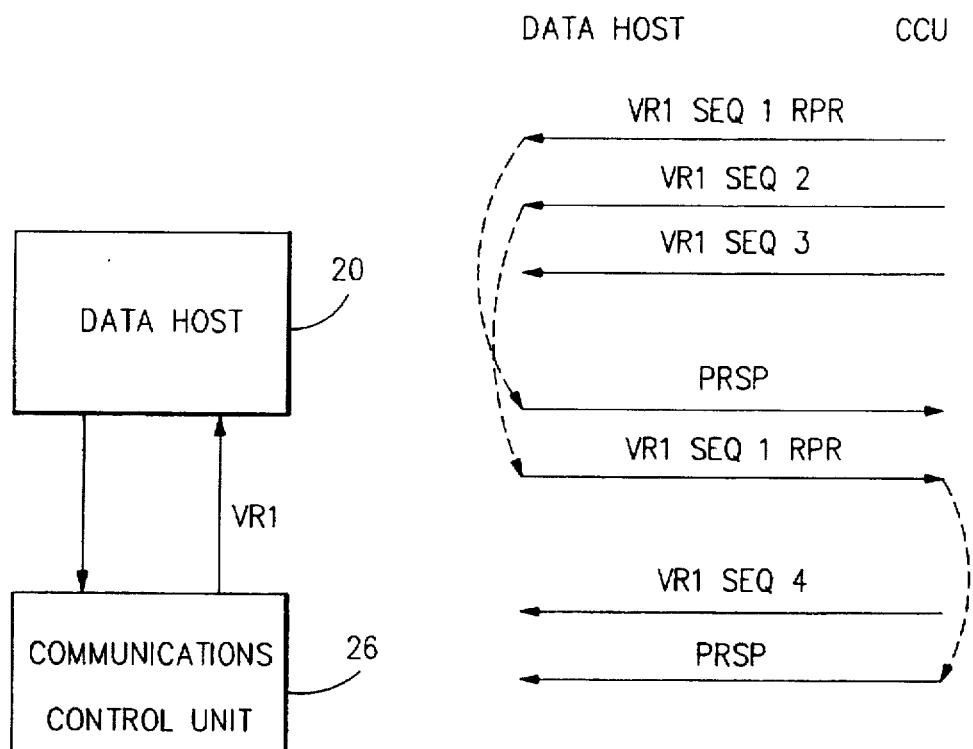
FIG.4
FIG.5

VIRTUAL ROUTE SYNCHRONIZATION

CROSS-REFERENCE TO RELATED APPLICATION

This is a continuation of application Ser. No. 07/722,720, filed Jun. 27, 1991, now abandoned.

BACKGROUND OF THE INVENTION

1. Field of the Invention

The present invention relates to the operation of computerized data communication networks, and more particularly, to the recovery of communication network operations after a failure of one of the network components.

2. Background of the Invention

Computer data communication networks are used to transmit information between geographically dispersed computers and between user devices such as computer terminals or workstations and host computer applications. A variety of communication architectures exist. Data communication architectures such as the IBM System Network Architecture (SNA) and the International Standards Organization (ISO) Open Systems Interconnection (OSI) Architecture define an architecture in terms of functional layers. The SNA and OSI layered architecture models are shown in FIG. 1. The architecture defines functional layers with well defined interfaces between the layers. This allows interchangeability of a single layer's components without impacting the overall operation of the network.

The two lowest layers of the SNA architecture are Data Link Control (DLC) and Path Control. Path Control is in turn divided into Transmission Group Control, Explicit Route Control and Virtual Route Control. At a higher level, Data Flow Control implements session control. Session control defines the end to end communication between a particular terminal and a system application. For example, a workstation or terminal is operated by a computer user to enter and display data from a host application. A host application, such as a banking system for tracking customer accounts or an airline reservation system for tracking seat reservations, accepts requests for data and returns the desired information to the requestor. The session defines the connection between a terminal and an application and is unconcerned with the physical details of that interconnection.

An SNA network is defined in terms of Network Addressable Units (NAUs). Each NAU has a unique address and can send and receive messages. NAUs are divided into two classes: peripheral nodes and subarea nodes. A subarea node has an ability to route messages, while a peripheral node can only receive and transmit messages from and to the subarea to which it is attached. A subarea is defined as a subarea node and all attached peripheral nodes, if any.

SNA specifies three types of Network Addressable Units: System Service Control Points (SSCP); Logical Units (LU); and Physical Units (PU). The SSCP controls the physical configuration of the resources in the domain, including establishing communications paths and testing resources. Physical units are software entities for managing the physical connection of the network. Logical units perform user or application tasks.

The physical interconnection of a network is defined by the Data Link Control layer. This layer defines addressable devices and the physical paths connecting those devices. The physical definition may include particular communication control units and host processing systems that are to communicate.

Transmission Group Control defines one or more bidirectional logical connections between adjacent subarea nodes. Explicit route control defines bidirectional physical connections between end-to-end subarea nodes. Each explicit route (ER) consists of a fixed set of transmission groups, but can use at most one transmission group between two adjacent subareas. An explicit route can include one or more intermediate subarea nodes.

The virtual route layer defines an end-to-end logical connection between subareas supporting one or more sessions. Each virtual route is associated with an underlying Explicit Route. An Explicit Route can be associated with multiple Virtual Routes. Data flow over the virtual route is controlled by data pacing which defines a minimum and maximum window size and establishes a protocol for controlling the flow.

An example of a network is shown in FIG. 2. The network shown is an example of the use of the IBM Transaction Processing Facility (TPF) operating system to support transaction processing in, for example, a bank or airline application. Application processing occurs in host processor 20 frequently referred to as the "data host". The host processor can be one of a number of computer processors such as the IBM 3090 system. Communications from processor 20 are routed through a communication control unit (CCU) 22, such as the IBM 3745 or 3725. CCU 22 is connected over communication lines 24 to a compatible communications control unit 26 at the remote location. Communications control unit 26 has a plurality of communication lines 28 connected to control units 30. Each of these control units, in turn, can have a plurality of terminal devices 32 including computer terminals, workstations, or printers.

A communication network configuration is typically controlled by a communications management configurator (CMC) 34, which can be an IBM 3090 or similar system. The CMC 34 provides the System Service Control Point (SSCP) for the illustrated network and operates to establish the resource configuration. Additional communication control units 36 can be connected to host 20 and communication management configurator 34. These, in turn, are connected to remote CCUs and devices.

The application host 20, communications management configurator 34, communication control units 22, 26, and 36 are each subarea network addressable devices or nodes. The interconnection of these subareas defines a subarea network 40. The interconnections between subarea nodes are defined in physical terms as explicit routes connecting subareas. For example, Explicit Route 1 (ER1) is shown at 42 and 43, Explicit Route 3 (ER3) at 44 and 46 and Explicit Route 4 (ER4) at 48.

Virtual routes are defined as endpoint to endpoint connections between subareas. For example, Virtual Route 1 (VR1) is shown at 50 connecting data host 20 to CCU 24 and connecting CCU 24 to CCU 26.

A session is created between a terminal or logical unit 52 and data host 20. The session requires data to flow from terminal 52 through control unit 31, CCU 26 and via virtual route 1 50 to data host 20. Virtual route 1 50 carries all session traffic between CCU 26 and data host 20. This is shown figuratively in FIG. 3 where a number of applications A, B, C, and so on, have sessions that are routed through a virtual route to terminals 1, 2, 3, ... N. The virtual route thus acts as a pipeline for messages between the terminals and the applications.

The communications between a data host 20 and communication control unit 26 over a virtual route can be shown, in simplified form, in FIG. 4. Virtual Route 1 (VR1) carries the two-way communication of messages between the communication control unit and the data host. A data communication architecture requires that some control be exercised over the messages passing between the two devices. Errors in communication or interference introduced on the communication lines may corrupt messages or cause the loss of messages between units. Network integrity requires that the communication over the virtual route be monitored to ensure that no messages are lost.

The SNA architecture controls messages integrity over a virtual route by the sending node assigning sequence numbers to each message and by verifying at the recipient (data host 20 or communication control unit 26) that each message is received in sequence. The architecture also provides data pacing as a method for controlling data flow so that the recipient is not overwhelmed by a number of messages that it cannot process or store. Data pacing defines a variable window as a number of messages that will be sent before waiting for a response from the recipient. The message sender will first send a "Pacing Response Request" asking that the recipient respond when it can accept additional messages. When the recipient has the capacity to receive another window of messages, it generates a "Pacing Response" to the sender.

A series of messages between a data host 20 and communication control unit 26 is shown in FIG. 5. CCU 26 generates the first message over virtual route 1 (VR1) with a sequence number of 1 and a Request for a Pacing Response (RPR). Additional messages with sequence number 2, 3, and so forth, are next sent by CCU 26. After a period of time data host 20 responds to the pacing request with a pacing response (PRSP) and begins sending messages with consecutive sequence numbers as shown. The recipient monitors the sequence numbers as they are received and discards any message arriving out of sequence.

Initial startup and configuration of a large communications network (e.g. 20,000 terminals) by the SSCP can take an hour or more. The communications setup initializes all transmission sequences, determines configuration information, and sends the necessary set up and test messages to ensure that all elements in a network are ready to respond. Once established, the network can operate indefinitely without reinitialization.

The failure of the data host 20 or other component can cause the entire communication network to cease operation. Because of the need to maintain the sequence of messages between the data host 20 and other components, communications with the failing unit can only be restarted if the sequence number information is known or if the entire communications network is reinitialized. Reinitialization of a large network is highly undesirable because of the considerable time required. This lost time can be costly to a business that is dependent upon transaction processing for its operations. Various schemes have been proposed for retaining sequence information so that the network can be restarted without reinitialization. However, data host failure may occur unpredictably and may not afford an opportunity to save the necessary sequencing information. In these situations, a network reinitialization is required. There is therefore a need to have a system or method for resynchronizing data communications without reinitializing the network.

The present invention addresses the technical problem of recovering synchronization information lost during a network component failure. It also is directed to the problem of resynchronizing message traffic between adjacent communication components following a component failure.

SUMMARY OF THE INVENTION

The present invention is directed to a method for recovering system operation after a communications network outage. In particular, the present invention is directed to a means for resynchronizing message traffic between adjacent subareas in a data communication network. Synchronization information contained in an operational component is queried by the failing component and is used to re-establish synchronized communications.

It is therefore an object of the present invention to provide a means to rapidly resynchronize and recover virtual network routes without reinitializing the communications network. It is a further object of the invention to provide a method of resynchronization of message traffic that can occur quickly with low system processing overhead.

These and other objects of the invention will become more clear in the following detailed description of the preferred embodiment.

BRIEF DESCRIPTION OF THE DRAWINGS

FIG. 3 is an illustration of the bundling of communications sessions into a virtual route.

FIG. 4 is a simplified diagram illustrating communications between a data host and communications control unit.

FIG. 5 is a diagram illustrating message sequences over time between two components of a communications network.

DETAILED DESCRIPTION OF THE PREFERRED EMBODIMENT

The detailed description of the preferred embodiment will be described in terms of the IBM SNA architecture. It will be understood by data communications practitioners that the concepts introduced herein may be applied to an OSI model or to any other network architecture that provides similar layered components. The use of SNA terms and descriptions is not meant to limit the scope of the invention in any way.

Figure 1:
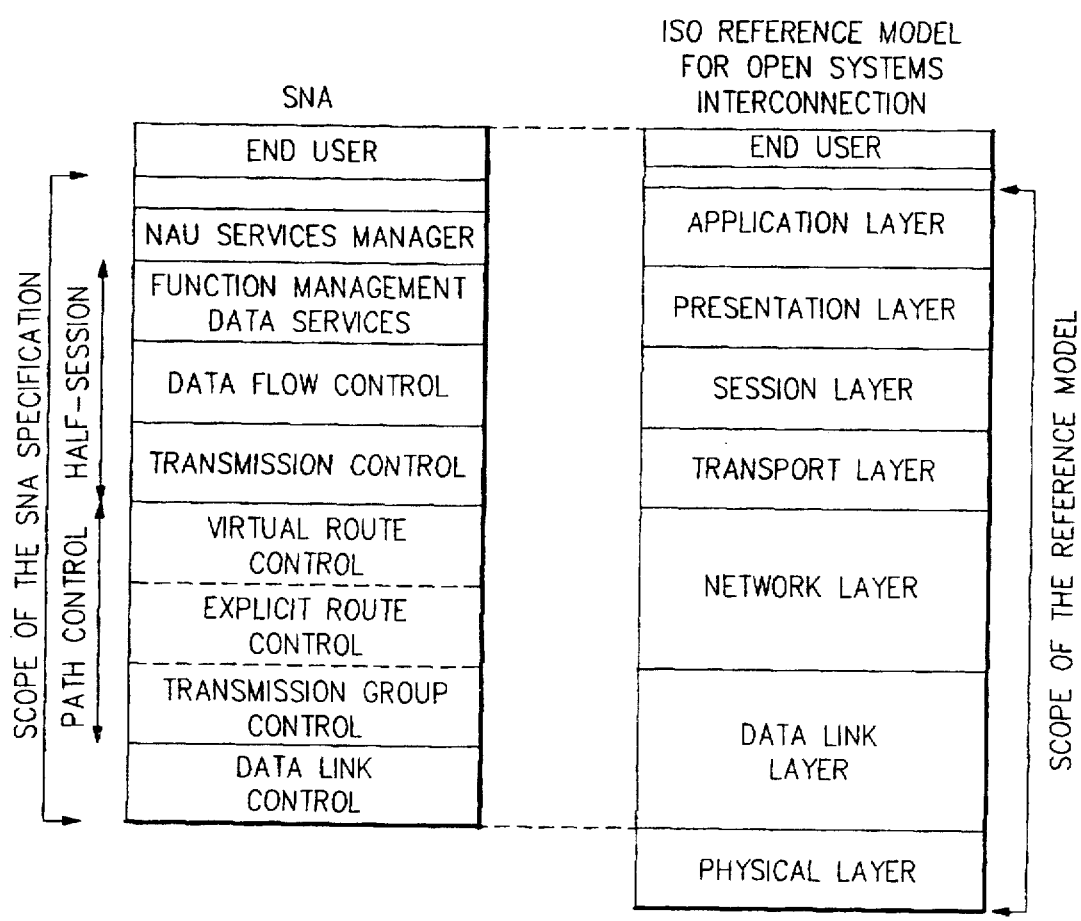
FIG. 1 is a block diagram showing SNA and OSI layered communications architectures.
Figure 2:
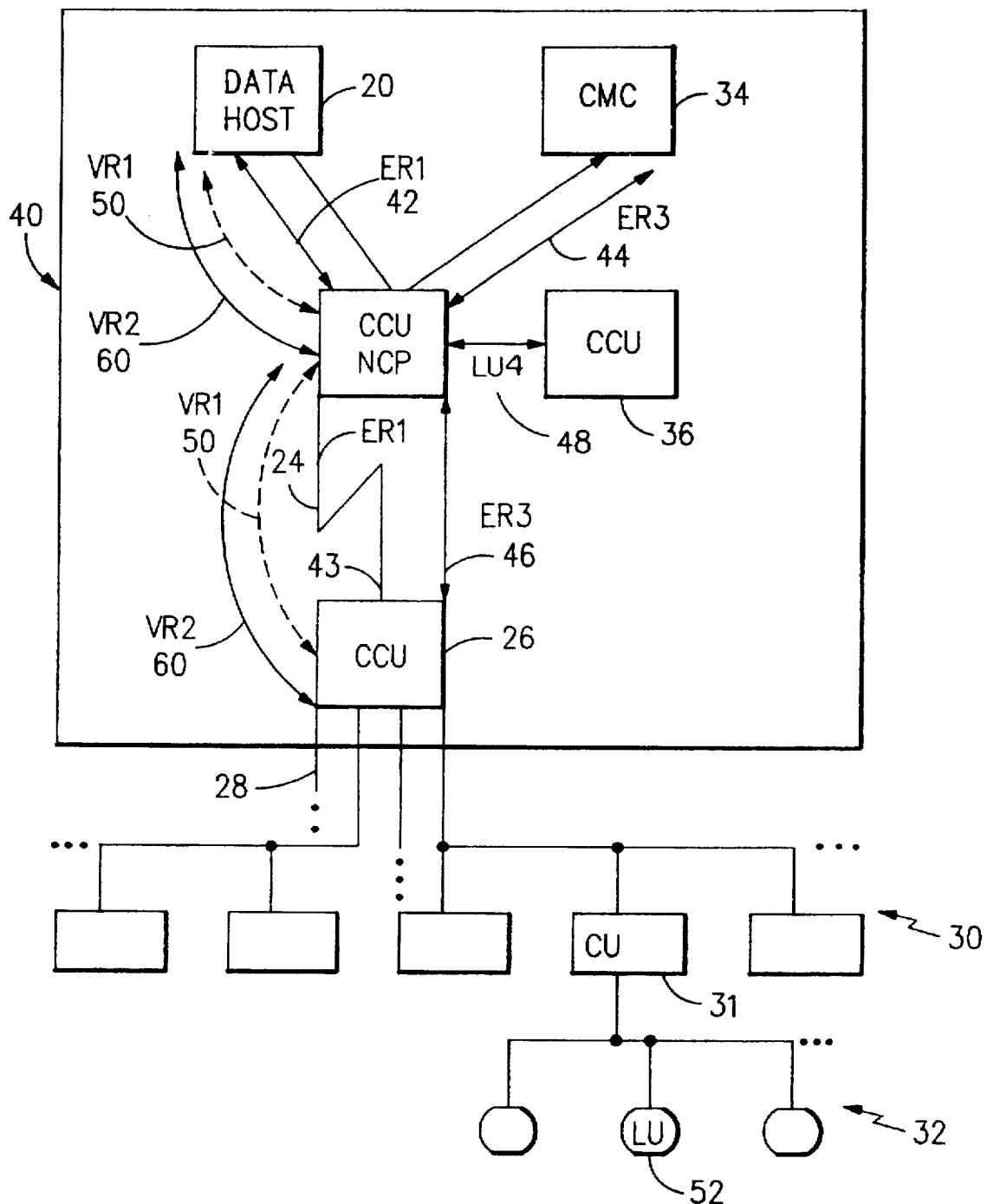
FIG. 2 is a block diagram of a data communications network in which the present invention can be employed.

The communication network in FIG. 2 depicts a data host 20 and communication control unit 26 connected by Virtual Route 1 (VR1). The failure of data host 20 will disrupt operation until the host 20 is restored and message traffic resynchronized. Modern computer systems frequently allow rapid recovery from a host outage (within a few minutes). In addition, many systems are defined with backup components that can be almost instantaneously started to take over the processing of a failed component. Once the data host is again operational, the task of resuming data communications must be addressed.

Prior art systems included an ability to checkpoint or store certain data values if the system failed in a controlled manner. Hardware outages, however, frequently cause an uncontrolled failure with no opportunity for storing message sequence numbers or pacing request status. In prior art systems such an uncontrolled failure required reinitialization of the communication network, a procedure that could require an hour or more.

The present invention is directed to providing a method for recovering from an uncontrolled data host failure without reinitializing the communication network. The failure of data host 20 halts the receipt and sending of messages over virtual route 1 50. Restoring host operation does not restart message transmission due to the loss of message sequencing and pacing requirements. Messages sent from host 20 to CCU 26 without the proper sequence number would be discarded causing a loss of data. In the preferred embodiment, message sequence numbers in the range of 0-4095 are used. It is, therefore, impossible for the host system to guess or test to determine the next sequence number. Therefore, unless the proper sequence is known, communications may not be restarted and communication over virtual route 1 50 is disabled.

In a similar manner, the pacing response request and pacing response must be synchronized. If control unit 26 has requested a pacing response from host 20, it will wait until such a pacing response is received before sending the next window of messages. Upon restart, host unit 20 may not know of the outstanding pacing request and will therefore not transmit the needed response. This will result in a total failure of communications due to a pacing deadlock.

Failure of host 20 typically does not result in the failure of any adjacent subarea. In the above example, CCU 26 remains active and contains information as to the next sequence number it expects from host 20 and whether it is awaiting a pacing response. The disablement of virtual route 1, however, eliminates the ability of data host 20 to acquire information from CCU 26 because it cannot send a message unless it has the next sequence number.

The present invention overcomes this difficulty by establishing a second virtual route between said data host 20, CCU 24 and CCU 26. The additional route, virtual route 2 (VR2) 60, is shown is FIG. 2. Virtual route 2 must be established as a special control path because only an SSCP can issue status requests of CCU 26 thus are possible only by designating data host 20 as an SSCP node. Data host 20 must next send a status request to CCU 26 querying the state of virtual route 1. CCU 26 then constructs and runs a route test on virtual route 1 reporting the results to control unit 26, and in turn, to data host 20. Among the pieces of data collected by the route test are the next sequence number expected by CCU 26 and whether a pacing response request is pending.

Status response data is returned over virtual route 2 60 to data host 20. Host 20 updates its communications control information with the next sequence number and pacing response request status for virtual route 1 50. Once the status request is complete, virtual route 2 60 is deactivated. Using the updated information, virtual route 1 can resume communications with CCU 26 and can resume message processing at the point of failure without reinitializing the network.

Figure 6:
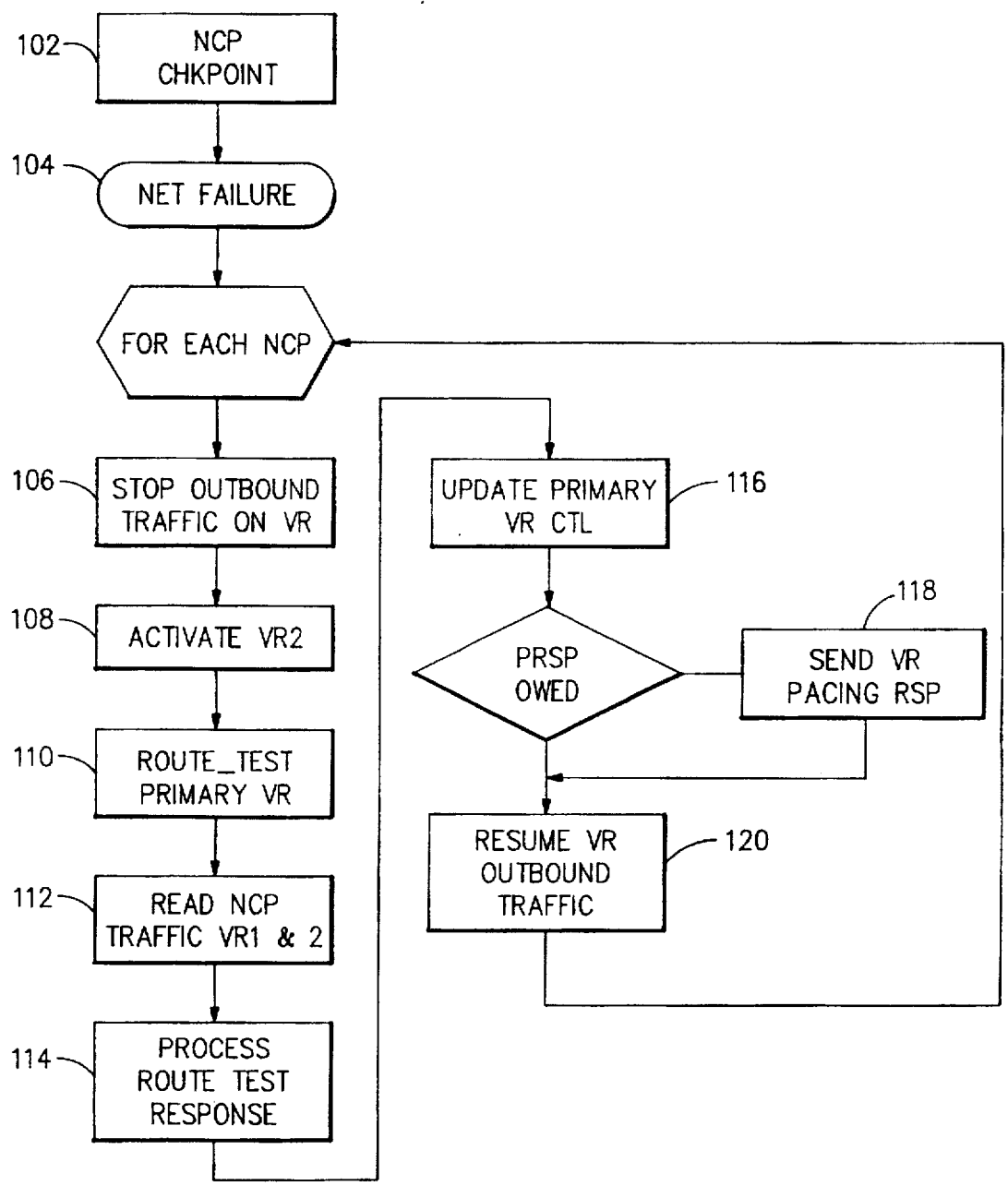
FIG. 6 is a flowchart describing the virtual route resynchronization process of the present invention.

The sequence of operation of the present invention is shown in greater detail in FIG. 6. Each communications control unit 24 operates using Network Control Program software (NCP). Upon activation of each NCP, an NCP control block checkpoint is taken noting link address, virtual route number, and that the NCP is active (step 102). After a data host failure 104, the network control programs are restarted. For each connected NCP, the following steps are taken to resynchronize data communications:

1. Stop outbound current traffic on the primary virtual route 106.

2. Activate a second virtual route 108.

3. Send route test for primary virtual route on secondary virtual route 110.

4. Read outstanding NCP traffic on secondary route (and primary route if the physical link is shared) until resynchronization is complete 112.

5. Process route test response 114.

6. Update host primary virtual route control information with sequence number and pacing information 116.

7. Send virtual route pacing response, if owed 118.

8. Resume outbound traffic on primary virtual route 120.

The present invention has been described in terms of its preferred embodiment above. It will be understood by those familiar with the art that alternative embodiments of the invention are possible. It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method of resynchronizing first and second nodes of a communications network following recovery from a failure at the first node, one of said nodes transmitting messages to the other of said nodes over a first route between said nodes in accordance with status information regarding messages previously transmitted over said route between said nodes, said method comprising the steps of:

sending a request from said first node to said second node over a second route between said nodes for said status information regarding said messages previously transmitted over said first route;

in response to said request, sending said status information from said second node to said first node over said second route; and resuming message transmissions between said nodes over said first route in accordance with said status information sent to said first node over said second route.

2. The method of claim 1 wherein each of said messages transmitted from said one node to said other node includes a sequence number from a predetermined sequence of numbers, each of said messages being tested upon receipt to determine whether its sequence number is the next number in said sequence and being discarded if its sequence number is not said next number, said status information indicating said next number in said sequence.

3. The method of claim 2 wherein consecutive messages have consecutive sequence numbers.

4. The method of claim 1 wherein said second node sends a predetermined number of messages to said first node and then waits for a response from said first node before sending further messages, said status information transmitted to said first node over said second route indicating whether said second node is waiting for a response, said first node transmitting said response to said second node over said first route if said status information indicates that the second node is waiting for said response.

5. The method of claim 5 wherein the transmitting node is said first node.

6. The method of claim 5, further comprising the step of suspending the transmission of messages over said first route before sending said request over said second route.

7. The method of claim 5 wherein said nodes are data processing systems.

8. The method of claim 5 wherein said first and second routes are virtual routes.

9. The method of claim 5, further comprising the step of establishing said second route between said first and second nodes following said recovery from said failure at said first node.

10. The method of claim 5, further comprising the step of deactivating said second route after the receipt of said status information at said first node.

11. The method of claim 1 wherein the transmitting node sends a predetermined number of messages to the receiving node and then waits for a response from the transmitting node before sending further messages, said status information transmitted to said first node over said second route indicating whether the transmitting node is waiting for a response.

12. Apparatus for resynchronizing first and second nodes of a communications network following recovery from a failure at the first node, one of said nodes transmitting messages to the other of said nodes over a first route between said nodes in accordance with status information regarding messages previously transmitted over said route between said nodes, said apparatus comprising:

means for sending a request form said first node to said second node over a second route between said nodes for said status information regarding said messages previously transmitted over said first route;

means responsive to said request for sending said status information from said second node to said first node over said second route; and means for resuming subsequent message transmission between said nodes over said first route in accordance with said status information sent to said first node over said second route.

13. The apparatus of claim 12 wherein each of said messages transmitted from said one node to said other node includes a sequence number from a predetermined sequence of numbers, each of said messages being tested upon receipt to determine whether its sequence number is the next number in said sequence and being discarded if its sequence number is not said next number, said status information indicating said next number in said sequence.

14. The apparatus of claim 13 wherein consecutive messages have consecutive sequence numbers.

15. The apparatus of claim 12 wherein said second node sends a predetermined number of messages to said first node and then waits for a response from said first node before sending further messages, said status information transmitted to said first node over said second route indicating whether said second node is waiting for a response, said first node transmitting said response to said second node over said first route if said status information indicates that the second node is waiting for said response.

16. The apparatus of claim 12 wherein the transmitting node is said first node.

17. The apparatus of claim 12 wherein said nodes are data processing systems.

18. The apparatus of claim 12 wherein said first and second routes are virtual routes.

19. The apparatus of claim 12, further comprising means for initially establishing said second route between said first and second nodes following said recovery from said failure at said first node.

20. The apparatus of claim 12, further comprising means for deactivating said second route after the receipt of said status information at said first node.

* * * * *

UNITED STATES PATENT AND TRADEMARK OFFICE
CERTIFICATE OF CORRECTION

PATENT NO. : 5,894,547
DATED : April 13, 1999
INVENTOR(S) : M. E. Baskey

It is certified that error appears in the above-identified patent and that said Letters Patent is hereby corrected as shown below:

Column 6, line 59, Claim 5, "The method of claim 5" should be --The method of claim 1--; Column 6, line 64, Claim 7, "The method of claim 5" should be --The method of claim 1--; Column 6, line 66, Claim 8, "The method of claim 5" should be --The method of claim 1--; Column 7, line 1, Claim 9, "The method of claim 5" should be --The method of claim 1--; Column 7, line 5, Claim 10, "The method of claim 5" should be --The method of claim 1--; and Column 7, line 22, "form" should be --from--.

Signed and Sealed this

Twenty-eighth Day of September, 1999

Attest:

*Attesting Officer*

Q. TODD DICKINSON

*Acting Commissioner of Patents and Trademarks*